US012759222B2

(12) United States Patent
Van Bommel et al.

(10) Patent No.: US 12,759,222 B2
(45) Date of Patent: Oct. 13, 2026

(54) 3D PRINTED MATERIAL HAVING COLOR AND/OR REFLECTIVITY CONTROL

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 83 days.

(21) Appl. No.: 18/696,522

(22) PCT Filed: Oct. 3, 2022

(86) PCT No.: PCT/EP2022/077462

§ 371 (c)(1), (2) Date: Mar. 28, 2024

(87) PCT Pub. No.: WO2023/061791

PCT Pub. Date: Apr. 20, 2023

(65) Prior Publication Data

US 2024/0408813 A1 Dec. 12, 2024

(30) Foreign Application Priority Data

Oct. 11, 2021 (EP) .................................... 21201823

(51) Int. Cl.

*B29C 64/118* (2017.01)
*B29C 64/209* (2017.01)

(Continued)

(52) U.S. Cl.

CPC .......... *B29C 64/118* (2017.08); *B29C 64/209* (2017.08); *B33Y 10/00* (2014.12);

(Continued)

(58) Field of Classification Search

CPC ............................ B29C 64/118; B29C 64/209

See application file for complete search history.

(56) References Cited

U.S. PATENT DOCUMENTS

| | | | | |
|---|---|---|---|---|
| 11,007,707 | B2 | 5/2021 | Hikmet et al. | |
| 2014/0291886 | A1* | 10/2014 | Mark | B33Y 10/00 264/259 |

(Continued)

FOREIGN PATENT DOCUMENTS

| | | | | |
|---|---|---|---|---|
| BE | 1026781 | A1 * | 6/2020 | B33Y 10/00 |
| WO | WO-2020039022 | A1 * | 2/2020 | B33Y 10/00 |

*Primary Examiner* — Susan D Leong
*Assistant Examiner* — Vipul Malik

(57) ABSTRACT

The invention provides a method for producing a 3D item (1) by means of fused deposition modelling using a fused deposition modeling 3D printer (500) comprising a printer nozzle (502), wherein the 3D item (1) comprises one or more layers (322) of 3D printed material (202), the method comprising a 3D printing stage comprising: —providing 3D printable material (201) to the printer nozzle (502), wherein: —the 3D printable material (201) comprises 3D printable core material (2101) and 3D printable first shell material (2201); —the 3D printable core material (2101) comprises a core thermoplastic material (2111) having a core thermoplastic material melting temperature $T_{mc1}$; —the 3D printable first shell material (2201) comprises a first shell thermoplastic material (2211) having a first shell thermoplastic material melting temperature $T_{ms1}$; wherein $T_{mc1}>T^{ms1}$; —the 3D printable first shell material (2201) has a 3D printable first shell material optical property, the 3D printable core material (2101) has a 3D printable core material optical property different from said 3D printable first shell material optical property; —controlling a temperature $T_{dm}$ of the 3D printable material (201) in the printer nozzle (502) according to a scheme wherein during a first (Continued)

time period $t_{p1}$: $T_{mc1}>T_{dm}>T_{ms1}$ applies and wherein during a second time period $_{tp2}$: $T_{dm}>T_{mc1}$ applies.

8 Claims, 4 Drawing Sheets

(51) Int. Cl.

| | |
|---|---|
| ***B29L 31/00*** | (2006.01) |
| ***B33Y 10/00*** | (2015.01) |
| ***B33Y 30/00*** | (2015.01) |
| ***B33Y 70/10*** | (2020.01) |
| ***B33Y 80/00*** | (2015.01) |
| ***F21V 7/04*** | (2006.01) |

(52) U.S. Cl.

CPC ............... *B33Y 30/00* (2014.12); *B33Y 70/10* (2020.01); *B33Y 80/00* (2014.12); *F21V 7/04* (2013.01); *B29K 2995/0012* (2013.01); *B29K 2995/0021* (2013.01); *B29K 2995/0026* (2013.01); *B29K 2995/003* (2013.01); *B29L 2031/747* (2013.01)

(56) References Cited

U.S. PATENT DOCUMENTS

| | | | | |
|---|---|---|---|---|
| 2018/0093412 | A1 | 4/2018 | Snyder et al. | |
| 2020/0009786 | A1* | 1/2020 | Hikmet .................. | B33Y 70/00 |
| 2020/0114572 | A1* | 4/2020 | Hikmet .................. | B33Y 10/00 |
| 2021/0197444 | A1* | 7/2021 | Van Hal, V ............ | B33Y 70/00 |

* cited by examiner

3D PRINTED MATERIAL HAVING COLOR AND/OR REFLECTIVITY CONTROL

CROSS-REFERENCE TO PRIOR APPLICATIONS

This application is the U.S. National Phase application under 35 U.S.C. § 371 of International Application No. PCT/EP2022/077462, filed on Oct. 3, 2022, which claims the benefit of European Patent Application No. 20201823.8, filed on Oct. 11, 2021. These applications are hereby incorporated by reference herein.

FIELD OF THE INVENTION

The invention relates to a method for manufacturing a 3D (printed) item. The invention also relates to the 3D (printed) item obtainable with such method. Further, the invention relates to a lighting device including such 3D (printed) item. Yet further, the invention may also relate to a 3D printer, such as for use in such method.

BACKGROUND OF THE INVENTION

The 3D printing articles including spatially different properties is known in the art. US2018/0093412, for instance, describes a method of printing a 3D article comprising selectively depositing a first portion of build material in a fluid state onto a substrate to form a first region of build material; selectively depositing a first portion of support material in a fluid state to form a first region of support material; and selectively depositing a second portion of build material in a fluid state to form a second region of build material, wherein the first region of support material is disposed between the first region of build material and the second region of build material in a z-direction of the article. In some cases, the first region of support material forms a grayscale pattern and/or a CMY color pattern in combination with the first region of build material and/or the second region of build material.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals, and polymers. 3D printing can also be used in producing molds which can then be used for replicating objects.

For the purpose of making molds, the use of polyjet technique has been suggested. This technique makes use of layer by layer deposition of photo-polymerizable material which is cured after each deposition to form a solid structure. While this technique produces smooth surfaces the photo curable materials are not very stable, and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast, low cost and can be used for printing complicated 3D objects. Such printers are used in printing various shapes using various polymers. The technique is also being further developed in the production of LED luminaires and lighting solutions.

It appears desirable to provide alternative 3D items and/or 3D printing methods, which may have controllable optical effects or optical appearance. It may further be desirable to provide a 3D item that is transmissive for visible light and/or which may scatter visible light, wherein the transmissivity and/or scattering may be controlled, or which may have other optical effects that can be controlled.

Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

Hence, in a first aspect the invention provides a method ("method" or "3D printing method") for producing a 3D item ("3D printed item") by means of fused deposition modelling, using a fused deposition modeling 3D printer ("3D printer" or "printer"). Especially, the fused deposition modeling 3D printer may comprise a printer nozzle ("nozzle"). Further, the 3D item may comprise one or more layers of 3D printed material. Especially, the method may comprise a 3D printing stage. The 3D printing stage may comprise providing 3D printable material to the printer nozzle. Especially, the 3D printable material may comprise 3D printable core material and 3D printable first shell material. Further, in embodiments the 3D printable core material may comprise a core thermoplastic material having a core thermoplastic material melting temperature $T_{mc1}$. Yet further, in embodiments the 3D printable first shell material may comprise a first shell thermoplastic material having a first shell thermoplastic material melting temperature $T_{ms1}$. Especially, in embodiments $T_{mc1}>T_{ms1}$. In embodiments, the 3D printable first shell material may have a 3D printable first shell material optical property and the 3D printable core material may have a 3D printable core material optical property. Especially, the latter is different from the former. Further, the 3D printing stage may further comprise controlling a temperature $T_{dm}$ of the 3D printable material in the printer nozzle according to a scheme. Especially, in the scheme in embodiments during a first time period $t_{p1}$: $T_{mc1}>T_{dm}>T_{ms1}$ may apply and during a second time period $t_{p2}$: $T_{dm}>T_{mc1}$ may apply. Hence, in specific embodiments the invention provides a method for producing a 3D item by means of fused deposition modelling using a fused deposition modeling 3D printer comprising a printer nozzle, wherein the 3D item comprises one or more layers of 3D printed material, the method comprising a 3D printing stage comprising: (A) providing 3D printable material to the printer nozzle, wherein: (a) the 3D printable material comprises 3D printable core material and 3D printable first shell material; (b) the 3D printable core material comprises a core thermoplastic material having a core thermoplastic material melting temperature $T_{mc1}$; (c) the 3D printable first shell material comprises a first shell thermoplastic material having a first shell thermoplastic material melting temperature $T_{ms1}$; wherein $T_{mc1}>T_{ms1}$; (d) the 3D printable first shell material has a 3D printable first shell material optical property, the 3D printable core material has a 3D printable core material optical property different from said 3D printable first shell material optical property; and (B) controlling a temperature $T_{dm}$ of the 3D printable material in the printer nozzle according to a scheme wherein during a first time period $t_{p1}$: $T_{mc1}>T_{dm}>T_{ms1}$ applies and wherein during a second time period $t_{p2}$: $T_{dm}>T_{mc1}$ applies.

With such method, it is possible to provide 3D items having spatially varying optical properties. Different layers, or even within layers, color, reflectively, transmission, and/or light conversion may vary. Hence, with the present method it may e.g. be possible to use a single filament for providing different optical properties at different positions within the 3D item. With the present invention it may also be possible to control the spatial distribution of optical properties while printing relatively easily. With the present invention, it may not be necessary to use multiple printer heads (though it is herein also not excluded to use multiple printer heads), but while printing, the (optical) properties of the 3D printed material may be controlled. In this way, when visible radiation irradiates the 3D item, a (human) observer of the 3D item may observer optically different parts of the 3D item, like optically different layers, like reflecting layers and non-reflecting or less reflecting layers, absorbing layers and non-absorbing or less absorbing layers, transmissive layers and less transmissive or (more) absorbing or reflective layers, light converting layers and non-light converting layers or layers having a lower light conversion efficacy, etc.

As indicated above, the invention provides amongst others a method for producing a 3D item by means of fused deposition modelling using a fused deposition modeling 3D printer.

The 3D printer especially comprises a printer nozzle. The nozzle can be a normal nozzle, with a single nozzle opening, or may be a core-shell nozzle or a core-shell-shell nozzle. When using a nozzle with a single opening, core-shell filaments or core-shell-shell filaments may be applied. When using a core-shell nozzle or a core-shell-shell nozzle, 3D printable particles (or "pellets") may be applied, which may be fed to the printer head to be extruded via a core nozzle (opening), a (first) shell nozzle (opening), or optionally a second shell nozzle (opening). Note that more shells than two may also be possible. The invention, however, is especially explained in relation to single nozzle nozzles, core-shell nozzles, and core-shell-shell nozzles.

Hence, in embodiments providing 3D printable material to the printer nozzle may comprise feeding a core-shell filament to the printer nozzle or providing 3D printable core material and 3D printable first shell material to a core-shell printer nozzle. In other embodiments, providing 3D printable material to the printer nozzle may comprise feeding a core-shell-shell filament to the printer nozzle (having a single nozzle opening) or providing 3D printable core material, 3D printable first shell material, and 3D printable second shell material to a core-shell-shell printer nozzle.

Especially, the 3D item may comprise one or more layers of 3D printed material. More especially, the 3D item may comprise a plurality of layers of 3D printed material. The 3D item may comprise two or more, like at least 5, such as at least 10, like in embodiments at least 20 layers of 3D printed material. In embodiments, the 3D item may comprise a stack of 3D printed layers.

The method for producing a 3D item by means of fused deposition modelling using a fused deposition modeling 3D printer may especially comprise a 3D printing stage. The 3D printing stage may comprise providing 3D printable material to the printer nozzle. As indicated above, this may be by using a core-shell or core-shell-shell filament or by using different types of e.g. 3D printable pellets, which may be extruded by the core or shell or optional second shell of the nozzle.

Hence, the 3D printable material may comprise 3D printable core material and 3D printable first shell material. Especially, the 3D printable core material comprises a core thermoplastic material having a core thermoplastic material melting temperature $T_{mc1}$, and the 3D printable first shell material comprises a first shell thermoplastic material having a first shell thermoplastic material melting temperature $T_{ms1}$; wherein $T_{mc1}>T_{ms1}$. Hence, the 3D printable first shell material may melt at a lower temperature that the 3D printable core material.

The term "3D printable core material" may especially refer to 3D printable material, that is available in a core of a filament of 3D printable material or may especially refer to 3D printable material that is fed in a core nozzle of a core-shell nozzle. The term "core thermoplastic material melting temperature" may indicate the melting temperature of the 3D printable core material (or the 3D printed core material).

The term "3D printable first shell material" may especially refer to 3D printable material, that is available in a first shell of a filament of 3D printable material or may especially refer to 3D printable material that is fed in a first shell nozzle of a core-shell nozzle. The term "first shell thermoplastic material melting temperature" may indicate the melting temperature of the 3D printable first shell material (or the 3D printed first shell material).

In embodiments, the 3D printable core material may comprise at least 80 vol. %, more especially at least 90 vol. %, yet even more especially at least 95 vol. %, such as at least 98 vol. % of the core thermoplastic material. The term "thermoplastic material" may also refer to a combination of different thermoplastic materials but may also refer to a single type of thermoplastic material.

In embodiments, the 3D printable first shell material may comprise at least 80 vol. %, more especially at least 90 vol. %, yet even more especially at least 95 vol. %, such as at least 98 vol. % of the first shell thermoplastic material. The term "thermoplastic material" may also refer to a combination of different thermoplastic materials but may also refer to a single type of thermoplastic material.

Further, the 3D printable core material and the 3D printable first shell material may have different optical properties. For instance, they may differ in one or more of color, hue, reflectively, transparency, absorption, and light conversion (see also below). Hence, the 3D printable first shell material may have a 3D printable first shell material optical property. Further, the 3D printable core material may have a 3D printable core material optical property. Especially, the 3D printable core material optical property and the 3D printable first shell material optical property are different.

The 3D printing stage may further comprise controlling a temperature $T_{dm}$ of the 3D printable material in the printer nozzle according to a scheme wherein during a first time period $t_{p1}$: $T_{mc1}>T_{dm}>T_{ms1}$ applies and wherein during a second time period $t_{p2}$: $T_{dm}>T_{mc1}$ applies. During the second time period the optical properties of the 3D printed material may differ from the optical properties of the 3D printed material during the first time period. In the second period, the optical properties of the 3D printable core material may in embodiments become more pronounced due to the melting of both the 3D printable core material and the 3D printable shell material. During the first period, in embodiments the optical properties of the core material may be less pronounce as it may be substantially hidden by the first shell material.

The first time period may in embodiments last at least 0.5 seconds, such as at least 1 second. In embodiments, the first time period may be at least 2 seconds. There may not be an upper limit in time for the first time period, but practically this may be about at maximum 1 hour, like at maximum 30 minutes.

The second time period may in embodiments last at least 0.5 seconds, such as at least 1 second. In embodiments, the second time period may be at least 2 seconds. There may not be an upper limit in time for the second time period, but practically this may be about at maximum 1 hour, like at maximum 30 minutes.

The terms "first time period" and "second time period" do not indicate a sequence but are only used to indicate different (non-overlapping) time periods. During the printing stage, there may be one or more first time periods and one or more second time period. In this way, a 3D printed item can be generated comprising different parts with different optical properties.

Here below, first some (general) embodiments, especially in relation to the 3D printing method are described.

As indicated above, the method comprises depositing during a printing stage 3D printable material. Herein, the term "3D printable material" especially refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material may be printed as a filament and deposited as such. In embodiments, the 3D printable material may be provided as filament or may be formed into a filament. Hence, whatever starting materials are applied, a filament comprising 3D printable material may be provided by the printer head and 3D printed. The term "extrudate" may be used to define the 3D printable material downstream of the printer head, but not yet deposited. The latter may be indicated as "3D printed material". In fact, the extrudate may be considered to comprises 3D printable material, as the material is not yet deposited. Upon deposition of the 3D printable material or extrudate, the material may thus be indicated as 3D printed material. Essentially, the materials may be the same material, as the thermoplastic material upstream of the printer head, downstream of the printer head, and when deposited, may essentially be the same material(s).

Herein, the term "3D printable material" may also be indicated as "printable material". The term "polymeric material" may in embodiments refer to a blend of different polymers but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action may comprise heating the 3D printable material above the glass transition and in embodiments above the melting temperature (especially when the thermoplastic polymer is a semi-crystalline polymer). In yet another embodiment, the 3D printable material comprises a (thermoplastic) polymer having a melting point ($T_m$), and the 3D printing stage may comprise heating the 3D printable material to be deposited on the receiver item to a temperature of at least the melting point. The glass transition temperature is in general not the same thing as the melting temperature. Melting is a transition which may occur in crystalline polymers. Melting may happen when the polymer chains fall out of their crystal structures and become a disordered liquid. The glass transition may be a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

As indicated above, the invention may thus provide a method comprising providing a filament of 3D printable material and printing during a printing stage said 3D printable material on a substrate, to provide said 3D item.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefine based elastomers, styrene based elastomers, etc. Optionally, the 3D printable material may comprise a 3D printable material selected from the group consisting of Urea formaldehyde, Polyester resin, Epoxy resin, Melamine formaldehyde, thermoplastic elastomer, etc. Optionally, the 3D printable material may comprise a 3D printable material selected from the group consisting of a polysulfone. Elastomers, especially thermoplastic elastomers, may especially be interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPEo)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for instance, polymers of methyl acrylate, ethyl acrylate, acrylamide, methacrylic acid, methyl methacrylate, n-butyl acrylate, and ethyl acrylate, etc. In embodiments, a polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

In specific embodiments, the 3D printable material (and the 3D printed material) may comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polytethylene terephthalate (PET), acrylonitrile butadiene styrene (ABS), poly(methyl methacrylate) (PMMA), polystyrene (PS), and styrene acrylic copolymers (SMMA).

The term 3D printable material is further also elucidated below, but may especially refer to a thermoplastic material, optionally including additives, to a volume percentage of at maximum about 60%, especially at maximum about 30 vol. %, such as at maximum 20 vol. % (of the additives relative to the total volume of the thermoplastic material and additives).

The printable material may thus in embodiments comprise two phases. The printable material may comprise a phase of printable polymeric material, especially thermoplastic material (see also below), which phase is especially an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, mechanical properties, electrical properties, thermal properties, and mechanical properties (see also above).

The printable material in embodiments may comprise particulate material, i.e. particles embedded in the printable polymeric material, which particles form a substantially discontinuous phase. The number of particles in the total mixture may especially not be larger than 60 vol. %, relative to the total volume of the printable material (including the (anisotropically conductive) particles) especially in applications for reducing thermal expansion coefficient. For optical and surface related effect number of particles in the total mixture is equal to or less than 20 vol. %, such as up to 10 vol. %, relative to the total volume of the printable material (including the particles). Hence, the 3D printable material may especially refer to a continuous phase of essentially thermoplastic material, wherein other materials, such as particles, may be embedded. Likewise, the 3D printed material especially refers to a continuous phase of essentially thermoplastic material, wherein other materials, such as particles, are embedded. The particles may comprise one or more additives as defined above. Hence, in embodiments the 3D printable materials may comprises particulate additives.

The printable material may be printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Layer by layer printable material may be deposited, by which the 3D printed item may be generated (during the printing stage). The 3D printed item may show a characteristic ribbed structures (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one more post processing actions may be executed after removing the printed item from the receiver item. Post processing may include e.g. one or more of polishing, coating, adding a functional component, etc. Post-processing may include smoothening the ribbed structures, which may lead to an essentially smooth surface.

In specific embodiments, the 3D printable first shell material optical property and the 3D printable core material optical property are selected from the group of (a) absorption of light having a first wavelength, (b) diffuse reflection for light having the first wavelength, (c) specular reflection for light having the first wavelength, (d) transmission of light having the first wavelength, and (e) conversion of light having the first wavelength. Further specific embodiments are described below.

The term "3D printable first shell material optical property" may especially refer to an optical property of the 3D printable first shell material. The term "3D printable core material optical property" may especially refer to an optical property of the 3D printable core material.

Some thermoplastic materials may be especially useful in the herein described method. Hence, in embodiments the 3D printable core material and 3D printable first shell material may be selected from the group of semicrystalline polymers. In embodiments, the 3D printable core material and 3D printable first shell material may be selected from the group of low density polyethylene, high density polyethylene, polypropylene, polyamide, polyoxymethylene, polybutylene terephthalate (PBT), and polytethylene terephthalate (PET). In embodiments, the polypropylene may be low crystalline or high crystalline. The polyamide may e.g. be Nylon 6, nylon 6,6, nylon 4,6 etc.

In embodiments, $T_{mc1}>(T_{dm}+5° C.)>(T_{ms1}+5° C.)$ during the first time period, more especially $T_{mc1}>(T_{dm}+10° C.)>(T_{ms1}+10° C.)$. Further, in embodiments $T_{dm}>(T_{mc1}+5° C.)$ during the second time period, more especially $T_{dm}>(T_{mc1}+10° C.)$. Therefore, $T_{mc1}>(T_{dm}+10° C.)>(T_{ms1}+10° C.)$ and $T_{dm}>(T_{mc1}+10° C.)$ may apply (during the first time period and second time period, respectively). Hence, in embodiments during the first time period $t_{p1}$ $T_{mc1}>(T_{dm}+10° C.)>(T_{ms1}+10° C.)$ and during the second time period $t_{p2}$ $T_{dm}>(T_{mc1}+10° C.)$ may apply.

Especially, in embodiments $T_{mc1}>(5° C.+T_{ms1})$, more especially $T_{mc1}>(10° C.+T_{ms1})$. Further, in embodiments $T_{mc1}\leq(100° C.+T_{ms1})$, such as $T_{mc1}\leq(50° C.+T_{ms1})$.

In embodiments, the 3D printable core material may have a first color, the 3D printable first shell material may have a second color, different from the first color. Especially, at least part of the 3D printed material has a tertiary color, wherein the tertiary color is a mix color of the first color and the second color. Especially, the tertiary color may be obtained during the second period. Especially, the tertiary color of the 3D printed material may be produced during the second time period.

Herein, the term color may also refer to black or white, and to any of the known colors, like blue, green, yellow, orange, red, or cyan, amber, etc.

In embodiments, the 3D printable first shell material may be transmissive for at least part of the visible light. Alternatively or additionally, the 3D printable core material may be reflective for at least part of the visible light. During the first time period the (during this first time period produced) 3D printed material may have a reflectance than during the second time period.

In specific embodiments, the 3D printable first shell material may have a higher value according to the Munsell color system or a higher chroma according to the Munsell color system than the 3D printable core material. During the first time period the (during this first time period produced) 3D printed material may have value and/or higher chroma according to the Munsell color system than during the second time period.

In embodiments, the 3D printable first shell material and the 3D printable core material comprise the same pigment. However, the concentrations may differ, like dark blue for the core and light blue for the shell. During the first time period the (during this first time period produced) 3D printed material may have a lighter blue appearance than during the second time period.

In embodiments, the 3D printable first shell material may comprise reflective particles, wherein the 3D printable core material optionally comprises reflective particles, wherein the 3D printable first shell material has a higher concentration of reflective particles than the 3D printable core material. During the first time period the 3D printed material may be more reflective than during the second time period.

In embodiments, the 3D printable first shell material may comprise reflective particles and the 3D printable core material may comprise one or more of a pigment and a luminescent material. During the first time period the 3D printed material may be reflective and during the second time period the 3D printed material may have a color and/or may be luminescent.

Hence, in embodiments the during this first time period produced 3D printed material may have an appearance closer to the 3D printable shell material than the during this second time period produced 3D printed material.

In embodiments, the optical properties of the 3D printable core material and (the optical properties of the) 3D printable first shell material may be selected from the group comprising: (a) ≥60% absorption of light having the first wavelength and the conversion of the absorbed light having the first wavelength is ≤10% of the absorbed light having the first wavelength; (b) ≥60% reflection of light having the first wavelength; (c) ≥60% transmission of light having the first wavelength; and (d) absorption and conversion of light having the first wavelength into second light having a spectral power distribution different from the absorbed light, wherein the conversion is at least 20% of the absorbed light having the first wavelength.

It may be useful when using a core-shell nozzle, that the shell is relatively thin. Hence, in the 3D printed material, the shell may also be relatively thin. Alternatively or additionally, for intermixing of the 3D printable core material and the 3D printable first shell material, it may also be desirable that the shell is relatively thin and/or that the interface between the 3D printable first shell material and the 3D printable core material when escaping from the core-shell nozzle is not smooth. The latter may e.g. be obtained when the shell nozzle has a no round shape, such as having protrusions and/or indentations (in cross-sectional view.

Hence, in embodiments the printer nozzle may be a core-shell printer nozzle, comprising a nozzle core and a first nozzle shell, wherein one or more of the following applies: (a) a first nozzle shell thickness (ds1) and a nozzle core diameter (dc1) relate according to 3*ds1≤dc1; (b) in cross-sectional view the first nozzle shell thickness (d1) varies angularly. For instance, in embodiments 4*ds1≤dc1.

As indicated above, the shell nozzle (and/or the core nozzle) may have protrusions and/or indentations (in cross-sectional view). This may facilitate contact between the 3D printable core material and the 3D printable first shell material and may thereby also facilitate mixing when the temperature is above the melting temperature of the 3D printable core material. Alternatively or additionally, this may also be facilitated by a not fully enclosing shell nozzle (i.e. a shell nozzle not fully enclosing the core nozzle). Hence, in embodiments an inner surface of the nozzle may be rough with roughness or features in the order of thickness of the first shell material or the first shell nozzle. Alternatively, the first shell nozzle may not cover the surface of the core completely.

Hence, in embodiments one or more of the following may apply: (i) an internal core nozzle surface and/or an external core nozzle surface may have in a cross-sectional view structures having a dimension selected from the range of 0.2*ds1–1.5*ds1; and (ii) in cross-sectional view the first nozzle shell comprises spatially separated sections.

In embodiments, the first nozzle shell thickness (ds1) may be at maximum 200 μm. For instance, the first nozzle shell thickness may be selected from the range of 10-100 μm, like 20-50 μm. Relatively thin first shell nozzles may also facilitate mixing of the first shell 3D printable material and the core 3D printable material. Hence, the first shell nozzle thickness may be substantially smaller than the core diameter. The latter may e.g. be at least 500 μm, such as at least 1 mm, more especially at least 1.5 mm, like at least at least 2 mm.

As indicated above, also a core-shell-shell nozzle may be applied. Embodiments as described above, may also apply. However, in such core-shell-shell nozzle three different materials may be applied. The core-shell-shell nozzle may have an inner core nozzle, an inner shell nozzle (or intermediate shell nozzle) and an outer shell nozzle. The outer shell nozzle is herein (still) indicated as first shell nozzle and the inner shell nozzle, configured between the core nozzle and first shell nozzle or outer shell nozzle, is indicated as second shell nozzle (or intermediate nozzle). Hence, the outer shell is herein also indicated as first shell.

Especially, the 3D printable material may comprise the 3D printable core material, the 3D printable first shell material, and 3D printable second shell material. With such nozzle, 3D printed material comprising a core—second shell—first shell structure may be provided. Further, especially the 3D printable second shell material may comprise a second shell thermoplastic material having a second shell thermoplastic material melting temperature $T_{ms2}$. In embodiments, $T_{mc1}>T_{ms2}>T_{ms1}$. Optical properties of the 3D printable second shell material may differ from the optical properties of the 3D printable core material, the 3D printable first shell material. Now, there may be three temperatures that may be relevant. In embodiments, the temperature $T_{dm}$ of the 3D printable material in the printer nozzle may be controlled according to the scheme wherein during a first time period $t_{p1}$: $T_{ms2}>T_{dm}>T_{ms1}$ applies, wherein during a second time period $t_{p2}$: $T_{mc1}>T_{dm}>T_{ms2}$ applies, and wherein during a third time period $t_{p3}$: $T_{dm}>T_{mc1}$ applies.

Hence, in embodiments the invention also provides a method wherein the 3D printing stage comprises: (a) providing 3D printable material to the printer nozzle, wherein: (i) the 3D printable material comprises the 3D printable core material, the 3D printable first shell material, and 3D printable second shell material; for providing 3D printed material comprising a core—second shell—first shell structure; (ii) the 3D printable second shell material comprises a second shell thermoplastic material having a second shell thermoplastic material melting temperature $T_{ms2}$; wherein $T_{mc1}>T_{ms2}>T_{ms1}$; (iii) optical properties of the 3D printable core material, the 3D printable first shell material, and the second shell material differ; and (b) controlling the temperature $T_{dm}$ of the 3D printable material in the printer nozzle according to the scheme wherein during a first time period $t_{p1}$: $T_{ms2}>T_{dm}>T_{ms1}$ applies, wherein during a second time period $t_{p2}$: $T_{mc1}>T_{dm}>T_{ms2}$ applies, and wherein during a third time period $t_{p3}$: $T_{dm}>T_{mc1}$ applies.

The term "3D printable second shell material" may especially refer to 3D printable material, that is available in a second shell of a filament of 3D printable material or may especially refer to 3D printable material that is fed in a second shell nozzle of a core-shell-shell nozzle. The term "second shell thermoplastic material melting temperature" may indicate the melting temperature of the 3D printable second shell material (or the 3D printed second shell material).

The first shell may be the outer shell. The second shell may be a shell closer to the core than the first shell.

In embodiments, the 3D printable second shell material may comprise at least 80 vol. %, more especially at least 90 vol. %, yet even more especially at least 95 vol. %, such as at least 98 vol. % of the second shell thermoplastic material. The term "thermoplastic material" may also refer to a combination of different thermoplastic materials but may also refer to a single type of thermoplastic material.

The third time period may in embodiments last at least 0.5 thirds, such as at least 1 third. In embodiments, the third time period may be at least 2 thirds. There may not be an upper limit in time for the third time period, but practically this may be about at maximum 1 hour, like at maximum 30 minutes.

The term "3D printable second shell material optical property" may especially refer to an optical property of the 3D printable second shell material. The term "3D printable core material optical property" may especially refer to an optical property of the 3D printable core material.

As indicated above, e.g. embodiments as described above in relation to the 3D printable core material and 3D printable first shell material, may also apply. Further, e.g. embodiments described above in relation to the nozzle or to 3D printable material in general, or to optical properties, may also apply. Some embodiments are discussed in more detail below.

Especially, the 3D printable second shell material optical property may (also) be selected from the group of (a) absorption of light having a first wavelength, (b) diffuse reflection for light having the first wavelength, (c) specular reflection for light having the first wavelength, (d) transmission of light having the first wavelength, and (e) conversion of light having the first wavelength.

The optical properties of the 3D printed material may now depend upon the 3D printed core material, the 3D printed first shell material and the 3D printed second shell material. By controlling the temperature of the 3D printable material in the nozzle, the optical properties of the 3D printed material may be controlled.

In embodiments, the method comprises producing a primary part of the one or more layers of 3D printed material during the first time period and producing a secondary part of the one or more layers of 3D printed material during the second time period, wherein the 3D printed material produced during the first time period has a primary 3D printed material optical property, wherein the 3D printed material produced during the second time period has a secondary 3D printed material optical property, different from the primary 3D printed material optical property.

In embodiments, the primary 3D printed material optical property may essentially be based on the optical property of the 3D printable material.

In embodiments, the secondary 3D printed material optical property may be a combination of the 3D printable first shell material optical property and the 3D printable second shell material optical property. Especially, this may be the case when the printing temperature is below the 3D printable material melting temperature. In other embodiments, the secondary 3D printed material optical property may be a combination of the 3D printable first shell material optical property, the 3D printable second shell material optical property, and the 3D printable core material. Especially, this may be the case when the printing temperature is above the 3D printable material melting temperature.

As can be derived from the above, (also) the 3D printable second shell material may especially be selected from the group of) (semicrystalline) polymers, such as)) low density polyethylene, high density polyethylene, polypropylene, polyamide, polyoxymethylene, polybutylene terephthalate, and polytethylene terephthalate.

In embodiments, during the first time period $T_{ms2}>(T_{dm}+5°\text{ C.})>(T_{ms1}+5°\text{ C.})$, and during the second time period $T_{mc1}>(T_{dm}+5°\text{ C.})>(T_{ms2}+5°\text{ C.})$, and during the third time period $T_{dm}>(T_{mc1}+5°\text{ C.})$ apply. More especially, during the first time period $T_{ms2}>(T_{dm}+10°\text{ C.})>(T_{ms1}+10°\text{ C.})$, and during the second time period $T_{mc1}>(T_{dm}+10°\text{ C.})>(T_{ms2}+10°\text{ C.})$, and during the third time period $T_{dm}>(T_{mc1}+10°\text{ C.})$ may apply Especially, $T_{mc1}>(5°\text{ C.}+T_{ms2})$, more especially $T_{mc1}>(10°\text{ C.}+T_{ms2})$. Further, $T_{mc1}\leq(100°\text{ C.}+T_{ms2})$, such as $T_{mc1}\leq(50°\text{ C.}+T_{ms2})$. Especially, $T_{ms1}>(5°\text{ C.}+T_{ms2})$, more especially $T_{ms1}>(10°\text{ C.}+T_{ms2})$.

In embodiments, the 3D printable core material has a first color, the 3D printable first shell material has a second color, and the 3D printable second shell material has a third color different, wherein the first color, the second color, and the third color are mutually different; and wherein at least part of the 3D printed material has a tertiary color, wherein the tertiary color is a mix color of the second color, the third color, and optionally the first color.

In embodiments, the 3D printable second shell material may be transmissive for at least part of the visible light. Alternatively or additionally, the 3D printable core material may be reflective for at least part of the visible light.

Further, when the 3D printable second shell material is transmissive for at least part of the visible light the 3D printable first shell material may also be transmissive for at least part of the visible light. However, other embodiments may also be possible, with a colored 3D printable first shell material (2201, which may when choosing a temperature above the melting temperature of the 3D printable first shell material and especially also above the melting temperature of the 3D printable second shell material may mix, and lead to a light transmissive colored outer layer.

In specific embodiments, the 3D printable first shell material may have a higher value according to the Munsell color system or a higher chroma according to the Munsell color system than the 3D printable second shell material. Especially, the 3D printable second shell material may have a higher value according to the Munsell color system or a higher chroma according to the Munsell color system than the 3D printable core material.

In embodiments, the 3D printable first shell material, the 3D printable second shell material, and the 3D printable core material may comprise the same pigment. However, the concentrations in the respective 3D printable materials may differ.

In specific embodiments, the 3D printable first shell material may comprise reflective particles, the 3D printable second shell material may optionally comprise reflective particles, the 3D printable core material may optionally comprise reflective particles. Especially, the 3D printable first shell material may have a higher concentration of reflective particles than the 3D printable core material or the 3D printable second shell material.

In embodiments, the 3D printable first shell material and/or the 3D printable second shell material may comprise reflective particles and the 3D printable core material comprises one or more of a pigment and a luminescent material.

Especially, the optical properties of the 3D printable core material, 3D printable first shell material, and the 3D printable second shell material may be selected from the group comprising: (a) ≥60% absorption of light having the first wavelength and the conversion of the absorbed light having the first wavelength is ≤10% of the absorbed light having the first wavelength; (b) ≥60% reflection of light having the first wavelength; (c) ≥60% transmission of light having the first wavelength; and (d) absorption and conversion of light having the first wavelength into second light having a spectral power distribution different from the absorbed light, wherein the conversion is at least 20% of the absorbed light having the first wavelength.

As indicated above, the printer nozzle may be a core-shell-shell printer nozzle, comprising the nozzle core, the first nozzle shell, and a second nozzle shell (5312) configured between the nozzle core and the first nozzle shell. In embodiments, one or more of the following may apply: (a) a first nozzle shell thickness (ds1) and the nozzle core diameter (dc1) relate according to 3*ds1≤dc1; (b) a second nozzle shell thickness (ds2) and the nozzle core diameter (dc1) relate according to 3*ds2≤dc1; (c) in cross-sectional view the first nozzle shell thickness (d1) varies angularly; and (d) in cross-sectional view the second nozzle shell thickness (d2) varies angularly. Further, in specific embodiments the second nozzle shell thickness (ds2) may be at maximum 50 μm.

Especially, the method may comprise depositing the 3D printable material escaped from the printer nozzle, to provide the 3D item, wherein the 3D item comprises a layer of 3D printed material of 3D printed material, wherein over at least part of a length (L) of the layer of 3D printed material the optical properties of the 3D printed material vary. Alternatively or additionally, the method may comprise depositing the 3D printable material escaped from the printer nozzle, to provide the 3D item, wherein the 3D item comprises a plurality of layers of 3D printed material, wherein the optical properties of different parts of the 3D printed material differ.

Further, the invention relates to a software product that can be used to execute the method described herein. Therefore, in yet a further aspect the invention also provides a computer program product, when running on a computer which is functionally coupled to or comprised by a fused deposition modeling 3D printer, is capable of bringing about the method as described herein.

Hence, in an aspect the invention (thus) provides a software product, which, when running on a computer is capable of bringing about (one or more embodiments of) the method (for producing a 3D item by means of fused deposition modelling) as described herein.

The herein described method provides 3D printed items. Hence, the invention also provides in a further aspect a 3D printed item obtainable with the herein described method. In a further aspect a 3D printed item obtainable with the herein described method is provided. Especially, the invention provides a 3D item comprising 3D printed material, wherein the 3D item comprises one or more layers of 3D printed material. Especially, the 3D printed material comprises 3D printed core material and 3D printed first shell material. Further, especially the 3D printed core material may comprise a core thermoplastic material having a core thermoplastic material melting temperature $T_{mc1}$. Alternatively or additionally, the 3D printed first shell material may comprise a first shell thermoplastic material having a first shell thermoplastic material melting temperature $T_{ms1}$. In embodiments, $T_{mc1}>T_{ms1}$. Further, the 3D printed first shell material may have a 3D printed first shell material optical property and the 3D printed core material may have a 3D printed core material optical property different from said 3D printed first shell material optical property. Especially, the 3D item may comprise a primary part of the one or more layers of 3D printed material and a secondary part of the one or more layers of 3D printed material. Further, especially the primary part may have a primary 3D printed material optical property and the secondary part may have a secondary 3D printed material optical property, different from the primary 3D printed material optical property. Especially, one or more layers of the primary part and one or more layers of the secondary part have different cross-sectional distributions of the 3D printed core material and the 3D printed first shell material. Therefore, especially the invention also provides in embodiments a 3D item comprising 3D printed material, wherein the 3D item comprises one or more layers of 3D printed material, wherein: (a) the 3D printed material comprises 3D printed core material and 3D printed first shell material; (b) the 3D printed core material comprises a core thermoplastic material having a core thermoplastic material melting temperature $T_{mc1}$; (c) the 3D printed first shell material comprises a first shell thermoplastic material having a first shell thermoplastic material melting temperature $T_{ms1}$; wherein $T_{mc1}>T_{ms1}$; (d) the 3D printed first shell material has a 3D printed first shell material optical property, the 3D printed core material has a 3D printed core material optical property different from said 3D printed first shell material optical property; and (e) the 3D item comprises a primary part of the one or more layers of 3D printed material and a secondary part of the one or more layers of 3D printed material, wherein the primary part has a primary 3D printed material optical property, wherein the secondary part has a secondary 3D printed material optical property, different from the primary 3D printed material optical property; and wherein one or more layers of the primary part and one or more layers of the secondary part have different cross-sectional distributions of the 3D printed core material and the 3D printed first shell material.

The term “3D printed first shell material optical property” may especially refer to an optical property of the 3D printed first shell material. The term “3D printed core material optical property” may especially refer to an optical property of the 3D printed core material. Likewise, the term “3D printed second shell material optical property” may especially refer to an optical property of the 3D printed second shell material.

Note that due to the melting process, especially in the second time period for the core-shell process, or third time period, for the core-shell shell process, there may be a leas clear boundary between core and first shell, or first shell and second shell as can be in the not yet printed 3D materials, such as especially a core-shell filament or core-shell-shell filament (would such filament be used).

Especially, the 3D printed material comprises 3D printed core material and 3D printed first shell material. In embodiments, at least part of the one or more layers have a core-shell structure. This may lead to a cross-section of the layer(s) wherein the shell at least partly surrounds the core. The shell may comprise essentially the same material as the 3D printable shell material and the core may comprise essentially the same material as the 3D printable core material. As it now has been printed, it is indicated as 3D printed material. Hence, the shell may comprise essentially the same material composition as the 3D printable shell material and the core may comprise essentially the same material as the 3D printable core material. Especially, one or more layers may have a core-shell structure wherein the shell essentially consists of material having essentially the same composition as the 3D printable shell material, and wherein the core essentially consists of material having essentially the same composition as the 3D printable core material. Especially, this may the case when the layers have been 3D printed during the first time period (see also above).

In other embodiments, however some mixing may have occurred. This may lead to a less clear boundary between core material and shell material. In such embodiments, it may be possible that the shell has a composition which is a mixture of 3D printable core material and 3D printable shell material. However, a substantial part of the core may consist of material having a composition of essentially the 3D printable core material. Especially, this may the case when the layers have been 3D printed during the second time period (see also above). Hence, the secondary 3D printed material optical property may be a combination of the 3D printed first shell material optical property and the 3D printed core material optical property.

Hence, in embodiments an optical property of the during a first time period produced 3D printed material may have a more dominant 3D printable first shell optical property than an optical property of the during a second time period produced 3D printed material.

The 3D printed item may comprise a plurality of layers on top of each other, i.e. stacked layers. The width (thickness) and height of (individually 3D printed) layers may e.g. in embodiments be selected from the range of 100-5000 μm, such as 200-2500 μm, with the height in general being smaller than the width. For instance, the ratio of height and width may be equal to or smaller than 0.8, such as equal to or smaller than 0.6.

Within a layer, there may also be a change in composition, for instance when a core-shell printing process was applied and during the printing process it was changed from printing a first material (and not printing a second material) to printing a second material (and not printing the first material).

At least part of the 3D printed item may include a coating.

Some specific embodiments in relation to the 3D printed item have already been elucidated above when discussing the method. Below, some specific embodiments in relation to the 3D printed item are discussed in more detail.

As can be derived from the above, especially the 3D printed first shell material optical property and the 3D printed core material optical property may be selected from the group of (a) absorption of light having a first wavelength, (b) diffuse reflection for light having the first wavelength, (c) specular reflection for light having the first wavelength, (d) transmission of light having the first wavelength, and (e) conversion of light having the first wavelength. Further, as can be derived from the above, especially the 3D printed core material and 3D printed first shell material may be selected from the group of low density polyethylene, high density polyethylene, polypropylene, polyamide, polyoxymethylene, polybutylene terephthalate, and polytethylene terephthalate. In embodiments, the 3D printed core material and 3D printed first shell material may be selected from the group of semicrystalline polymers.

Further, in embodiments the 3D printed core material may have a first color, the 3D printed first shell material may have a second color, different from the first color; and the secondary 3D printed material optical property may be a mix color of the first color and the second color.

Of course, at least part of the one or more layers of the 3D printed material may comprise a core-shell-shell structure.

Therefore, especially the invention also provides in embodiments a 3D item comprising 3D printed material, wherein the 3D item comprises one or more layers of 3D printed material, wherein the 3D printed material comprises 3D printed core material, 3D printed first shell material, and 3D printed second shell material. Especially, the 3D printed core material may comprise a core thermoplastic material having a core thermoplastic material melting temperature $T_{mc1}$. Further, especially the 3D printed first shell material may comprise a first shell thermoplastic material having a first shell thermoplastic material melting temperature $T_{ms1}$. Yet further, especially the 3D printed second shell material may comprise a second shell thermoplastic material having a second shell thermoplastic material melting temperature $T_{ms2}$. Especially, $T_{mc1}>T_{ms2}>T_{ms1}$ may apply. Further, the 3D printed first shell material may have a 3D printed first shell material optical property, the 3D printed second shell material may have a 3D printed second shell material optical property, and the 3D printed core material may have a 3D printed core material optical property, all mutually differing. In embodiments, the 3D item may comprise a primary part of the one or more layers of 3D printed material and a secondary part of the one or more layers of 3D printed material, wherein the primary part has a primary 3D printed material optical property, wherein the secondary part has a secondary 3D printed material optical property, different from the primary 3D printed material optical property; and wherein one or more layers of the primary part and one or more layers of the secondary part have different cross-sectional distributions of the 3D printed core material and the 3D printed first shell material.

The length of a layer may in embodiments especially be at least 10 mm, like at least 20 mm, like in embodiments at least 40 mm, such as at least 50 mm. In further embodiments, the length of the layer may be even at least 10 cm, such as at least 50 cm, like in specific embodiments at least 100 cm. The at least part of a length may in embodiments be at least 10 mm, such as at least 20 mm (assuming a layer length of at least 20 mm). For layer lengths of at least 40 mm, the part may e.g. be at least 25% of the length of the layer, though other embodiments may also be impossible.

Layers may be curved, in an xy-plan, but in specific embodiments also in a z-direction. The length of the layer may be determined along a length axis of the layer, which may thus be curved. The "length axis" may also be indicated as "longitudinal axis".

In this way, the arrangement may be controlled while printing a layer and/or layer by layer the arrangement of the regions or parts may be controlled, without the necessity of using e.g. two or more printer heads. Hence, especially the method may comprise providing one or more of: (a) a layer wherein the optical properties vary over the length (L) of the layer, and (b) a plurality of layers; wherein two or more layers of the plurality of layers have different optical properties. The phrase "two or more layers of the plurality of layers have different optical properties", and similar phrases, may also indicated that a part of one of the layers and/or another part of another one of the layers have different optical properties.

For instance, over the length of the layer the optical properties may vary, e.g. from black to white (without grey in between). Or, for instance, over the length of the layer the optical properties may change from reflective to colored (without an intermediate zone). Intermediate zone may be obtained when different materials are subsequently provided to the printer head, which in the present invention can be avoided with the relative arrangements of the regions.

For instance, it may also be possible to provide a pattern of optical properties over at least part of the 3D item. For instance, this can be done in a single layer, but alternatively or additionally, this can be done over more than one layer. The pattern may be in a random, quasi-random, or patterned way. Especially, the pattern may be provided by spatially varying the optical properties between a plurality of layers. In specific embodiments, the method may comprise providing m layers and varying the optical properties over a same side of the m layers in a random, quasi-random, or patterned way, wherein m≥4, such as at least 10, like at least 15. Especially, the term "random" may refer to the absence of a repetitive pattern of specific optical properties. The term "quasi random" may refer to a random distribution of patterns of a specific optical property or a patterned distribution of randomly distributed patterns of the specific optical property. The term "patterned" may refer to a patterned distribution of a specific optical properties.

In specific embodiments, a first part of a layer of 3D printed material may have a different (larger or smaller) absorption than a second part of the same layer or a second part of another layer. Alternatively or additionally, a first part of a layer of 3D printed material may have a more diffuse reflection than a second part of the same layer or a second part of another layer. Alternatively or additionally, a first part of a layer of 3D printed material may have a more specular reflection than a second part of the same layer or a second part of another layer. Alternatively or additionally, a first part of a layer of 3D printed material may have a different transmission (larger or smaller) than a second part of the same layer or a second part of another layer. Alternatively or additionally, a first part of a layer of 3D printed material may have a different conversion (larger or smaller; or different spectral power diffusion of the converted light) than a second part of the same layer or a second part of another layer. The term "conversion", and similar terms, may especially refer to a conversion of light by a luminescent material.

In the above examples, the same type of optical properties is compared between two parts. However, it is also possible that the optical properties as such are different, like a first part of a layer of 3D printed material may have a first color and a second part of the same layer or a second part of another layer may be light transmissive. Or, in embodiments a first part of a layer of 3D printed material may reflective and a second part of the same layer or a second part of another layer may convert light.

Hence, especially the optical properties may be selected from the group of (a) absorption of light having a first wavelength, (b) diffuse reflection for light having the first wavelength, (c) specular reflection for light having the first wavelength, (d) transmission of light having the first wavelength, and (e) conversion of light having the first wavelength.

When different parts have different optical properties, this may especially indicate that they appear different to the human eye (or optical sensor) under identical observation conditions. For instance, two layers that appear different only due to a different arrangement of the layers, by which e.g. reflective properties differ to the human eye, may not be considered to have different optical properties, as e.g. under perpendicular observation, the layers may appear to have identical properties. However, two parts of one or more layers having essentially the same absorption, but one part able to convert part of the absorbed light having the first wavelength and the other part not able to convert, lead to parts that appear different to the human eye (or optical sensor), and thus have different optical properties. The same may e.g. apply to parts of one or more layers having essentially the same transmission value, but one part having a low transparency due to the absorption of the light and the other part having a relatively low transparency due to scattering, may lead to parts that appear different to the human eye (or optical sensor), and thus have different optical properties.

In specific embodiments the optical properties may be selected from the group (a) having a white color, (b) being black, (c) having metallic appearance, and (d) being light transparent. Alternatively or additionally, in specific embodiments the optical properties may be selected from the group (a) light reflectivity and (b) light transmissivity. Instead of the term "metallic appearance", and similar terms, also the term "metallic color", and similar terms, may be applied.

One of the optical properties may be ≥60% absorption (especially ≥70% absorption, more especially ≥75% absorption, most especially ≥80% absorption) of light having the first wavelength, wherein a conversion of the absorbed light (having the first wavelength) is ≤10% (especially the conversion of the absorbed light is ≤6%, more especially the conversion of the absorbed light is ≤3%, most especially the conversion of the absorbed light is ≤1%) of the absorbed light having the first wavelength. Hence, the light is absorbed without substantial conversion, like in the case of pigments. Especially, the absorption of the light having the first wavelength may be determined under perpendicular radiation of the 3D printable material (or 3D printed material) with the light having the first wavelength.

One of the optical properties may be ≥60% reflection (especially ≥70% reflection, more especially ≥75% reflection, most especially ≥80% reflection) of light having the first wavelength. Hence, absorption of the light having the first wavelength may especially be less than 40% (especially less than 30%, more especially less than 25%, most especially less than 20%). Especially, the reflection of the light having the first wavelength may be determined under perpendicular radiation of the 3D printable material (or 3D printed material) with the light having the first wavelength.

One of the optical properties may be ≥60% transmission of light having the first wavelength (especially ≥70% transmission, more especially ≥75% transmission, most especially ≥80% transmission). Hence, absorption and reflection may be less than 40% (especially less than 30%, more especially less than 25%, most especially less than 20%). Especially, the transmission of the light having the first wavelength may be determined under perpendicular radiation of the 3D printable material (or 3D printed material) with the light having the first wavelength.

One of the optical properties may be absorption and conversion of light having the first wavelength into second light having a spectral power distribution different from the absorbed light, wherein the conversion is at least 20% of the absorbed light having the first wavelength (especially at least 30%, more especially at least 35%, most especially at least 40%, more especially at least 50%, like e.g. at least 60%, yet even more especially at least 70%). Especially, the conversion of the light having the first wavelength may be determined under perpendicular radiation of the 3D printable material (or 3D printed material) with the light having the first wavelength. More especially, the absorption of light having the first wavelength is at least 30%, even more especially at least 50%, such as yet even more especially at least 60%. As indicated above, especially the absorption of the light having the first wavelength may be determined under perpendicular radiation of the 3D printable material (or 3D printed material) with the light having the first wavelength. Further, in embodiments, is at least 30% of the absorbed light having the first wavelength, like at least 50%, even more especially at least 60%.

Hence, in embodiments one or more parts of one or more layers may have a high reflection and one or more other parts of one or more (other) layers may have a low reflection. Alternatively or additionally, one or more layers may have a high reflection and one or more other layers may have a low reflection.

Hence, in embodiments one or more parts of one or more layers may have a high absorption and one or more other parts of one or more (other) layers may have a low absorption. Alternatively or additionally, one or more layers may have a high absorption and one or more other layers may have a low absorption.

Hence, in embodiments one or more parts of one or more layers may have a high transmission and one or more other parts of one or more (other) layers may have a low transmission. Alternatively or additionally, one or more layers may have a high transmission and one or more other layers may have a low transmission.

Hence, in embodiments one or more parts of one or more layers may have a high conversion and one or more other parts of one or more (other) layers may have a low conversion. Alternatively or additionally, one or more layers may have a high conversion and one or more other layers may have a low conversion.

In embodiments, a difference between high and low may be a ratio of at least 1.25, like at least 1.5, such as at least 2, of the ratio of high reflection, absorption, transmission, conversion, and low reflection, absorption, transmission, conversion, respectively.

When two or more different optical properties are selected, these may in embodiments individually be selected from the group of high reflection, low reflection, high absorption, low absorption, high transmission, low transmission, high conversion, and low conversion. In other embodiments, two or more different optical properties are selected, these may in embodiments individually be selected from the group of high reflection, low reflection, high absorption, low absorption, high transmission but scattering, low transmission and scattering, high transmission and highly transparent, low transmission (and low transparency but essentially not due to scattering), high conversion, and low conversion.

Hence, in an example a primary part (first region) may have a high absorption and a secondary part (second region) may have a low absorption. However, in another example a primary part may have a high absorption and a secondary part may have a high transmission. In yet another example, a primary part has a high conversion, and a secondary part has a high transmission. In yet another example, a primary part may have a low transmission, but is transparent, and a secondary part has a low transmission (in is scattering). Other examples may also be possible.

The term "light having the first wavelength", and similar terms, may especially refer to light having a wavelength in the visible. The term "first wavelength" may also refer to a plurality of different wavelengths. For instance, light having the first wavelength may refer to essentially monochromatic light but may also refer to ambient light or artificial white light. Hence, terms like "absorption", "conversion", "transmission", or "reflection" may especially refer to absorption, conversion, transmission, or reflection of light having one or more wavelengths in the visible (especially selected from the wavelength range of 380-780 nm). Hence, instead of the terms "absorption", "conversion", "transmission", or "reflection" also the "light absorption", "light conversion", "light transmission", or "light reflection", respectively, may be applied. The phrase "having a wavelength", and similar phrases, may specially indicate that the light has spectral power at such wavelength. White light may thus have a plurality of wavelengths in the wavelength range of 380-780 nm. Especially, a light transmissive material may be translucent or transparent.

The term "plurality of layers" may especially refer to at least four layers, like at least 5 layers, like at least 10 layers, such as at least 15 layers. The term "plurality of layers" may especially refer to a stack of at least four layers, like a stack of at least 5 layers, such as a stack of at least 10 layers, such as a stack of at least 15 layers.

As can be derived from the above, primary 3D printed material optical property and the secondary 3D printed material optical property are especially different. Further, the primary 3D printed material optical property and the secondary 3D printed material optical property may especially be selected from the group comprising: (a) ≥60% absorption (especially ≥70% absorption, more especially ≥75% absorption, most especially ≥80% absorption) of light having the first wavelength and the conversion of the absorbed light having the first wavelength is ≤10% (especially ≤6%, more especially ≤3%, most especially ≤1%) of the absorbed light having the first wavelength; (b) ≥60% reflection (especially ≥70% reflection, more especially ≥75% reflection, most especially ≥80% reflection) of light having the first wavelength; (c) ≥60% transmission (especially ≥70% transmission, more especially ≥75% transmission, most especially ≥80% transmission) of light having the first wavelength; and (d) absorption and conversion of light having the first wavelength into second light having a spectral power distribution different from the absorbed light, wherein the conversion is at least 20% (especially at least 30%, more especially at least 35%, most especially at least 40%, more especially at least 50%, like e.g. at least 60%, yet even more especially at least 70%) of the absorbed light having the first wavelength.

The (with the herein described method) obtained 3D printed item may be functional per se. For instance, the 3D printed item may be a lens, a collimator, a reflector, etc . . . . The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light transmissive element, an optical filter, etc. The term optical component may also refer to a light source (like a LED). The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc . . . . Alternatively, or additionally, the functional component may comprise a thermal component (e.g. configured to cool or to heat an electrical component). Hence, the functional component may be configured to generate heat or to scavenge heat, etc.

As indicated above, the 3D printed item maybe used for different purposes. Amongst others, the 3D printed item maybe used in lighting. Hence, in yet a further aspect the invention also provides a lighting device comprising the 3D item as defined herein. In a specific aspect the invention provides a lighting system comprising (a) a light source configured to provide (visible) light source light and (b) the 3D item as defined herein, wherein 3D item may be configured as one or more of (i) at least part of a housing, (ii) at least part of a wall of a lighting chamber, and (iii) a functional component, wherein the functional component may be selected from the group consisting of an optical component, a support, an electrically insulating component, an electrically conductive component, a thermally insulating component, and a thermally conductive component. Hence, in specific embodiments the 3D item may be configured as one or more of (i) at least part of a lighting device housing, (ii) at least part of a wall of a lighting chamber, and (iii) an optical element. As a relative smooth surface may be provided, the 3D printed item may be used as mirror or lens, etc . . . . In embodiments, the 3D item may be configured as shade. A device or system may comprise a plurality of different 3D printed items, having different functionalities.

Returning to the 3D printing process, a specific 3D printer may be used to provide the 3D printed item described herein. Therefore, in yet a further aspect the invention also provides fused deposition modeling 3D printer, comprising (a) a printer head comprising a printer nozzle, (b) a 3D printable material providing device configured to feed 3D printable material having different optical properties to the printer nozzle, and (c) a control system; wherein the fused deposition modeling 3D printer may be configured to provide said 3D printable material to a receiver item, thereby providing a 3D item comprising 3D printed material, wherein in an operational mode the fused deposition modeling 3D printer is configured to execute the method as described herein.

The printer nozzle may include a single opening. In other embodiments, the printer nozzle may be of the core-shell type, having two (or more) openings. The term "printer head" may also refer to a plurality of (different) printer heads; hence, the term "printer nozzle" may also refer to a plurality of (different) printer nozzles.

The 3D printable material providing device may provide a filament comprising 3D printable material to the printer head or may provide the 3D printable material as such, with the printer head creating the filament comprising 3D printable material.

Especially, the printer nozzle may be a core-shell printer nozzle, comprising a nozzle core and a first nozzle shell, wherein one or more of the following applies: (a) a first nozzle shell thickness (ds1) and a nozzle core diameter (dc1) relate according to 3*ds1≤dc1; (b) in cross-sectional view the first nozzle shell thickness (d1) varies angularly. See further also above for specific embodiments of the printer nozzle.

Especially, the 3D printer may comprise a controller (or is functionally coupled to a controller) that is configured to execute in a controlling mode (or "operation mode") the method as described herein. Instead of the term "controller" also the term "control system" (see e.g. above) may be applied.

The term "controlling", and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling", and similar terms may additionally include monitoring. Hence, the term "controlling", and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
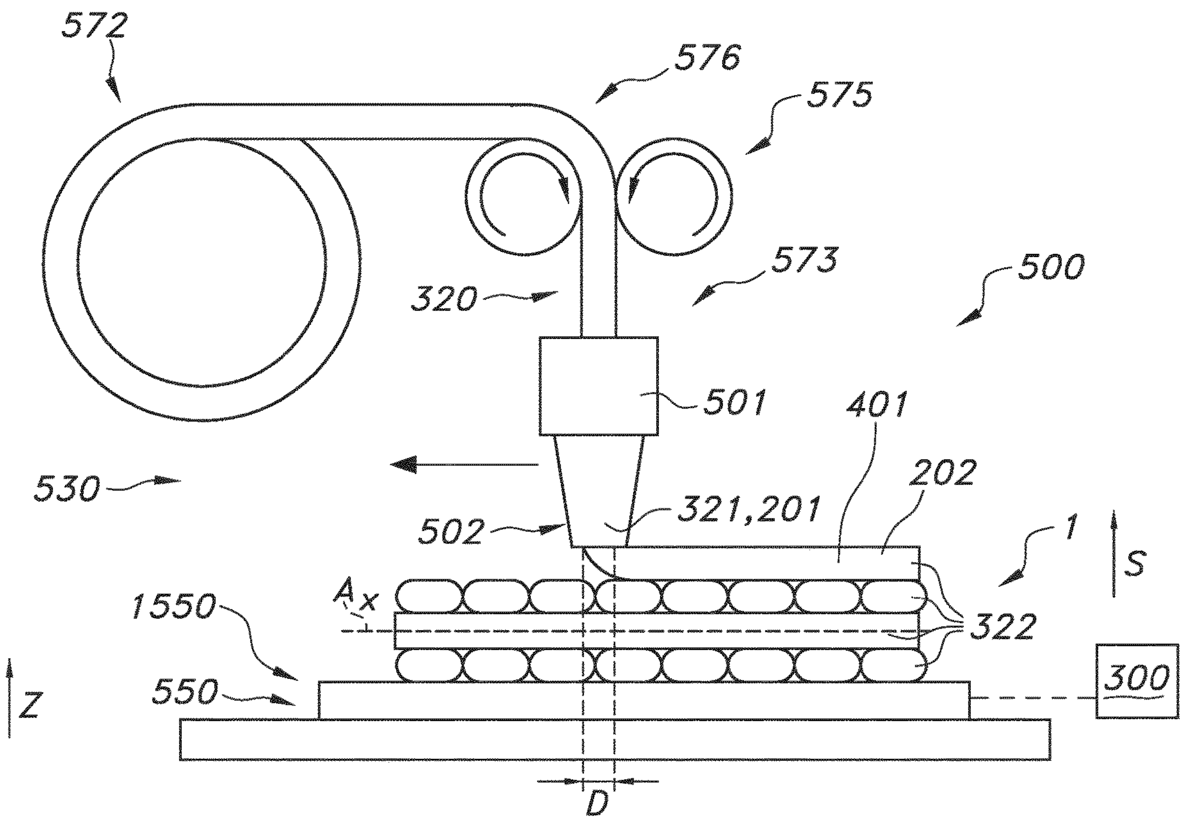
FIGS. 1*a*-1*c* schematically depict some general aspects of the 3D printer and of an embodiment of 3D printed material.

FIG. 1*a* schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as an FDM 3D printer head is schematically depicted. Reference 501 indicates the printer head. The 3D printer of the present invention may especially include a plurality of printer heads (see below). Reference 502 indicates a printer nozzle. The 3D printer of the present invention may especially include a plurality of printer nozzles, though other embodiments are also possible. Reference 320 indicates a filament of printable 3D printable material (such as indicated above).

Instead of a filament also pellets may be used as 3D printable material. Both can be extruded via the printer nozzle.

For the sake of clarity, not all features of the 3D printer have been depicted, only those that are of especial relevance for the present invention (see further also below). Reference 321 indicates extrudate (of 3D printable material 201).

The 3D printer 500 is configured to generate a 3D item 1 by layer-wise depositing on a receiver item 550, which may in embodiments at least temporarily be cooled, a plurality of layers 322 wherein each layer 322 comprises 3D printable material 201, such as having a melting point $T_m$. The 3D printable material 201 may be deposited on a substrate 1550 (during the printing stage). By deposition, the 3D printable material 201 has become 3D printed material 202. 3D printable material 201 escaping from the nozzle 502 is also indicated as extrudate 321. Reference 401 indicates thermoplastic material.

The 3D printer 500 may be configured to heat the filament 320 material upstream of the printer nozzle 502. This may e.g. be done with a device comprising one or more of an extrusion and/or heating function. Such device is indicated with reference 573 and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire, which may be indicated as filament 320. The 3D printer 500 transforms this in an extrudate 321 downstream of the printer nozzle which becomes a layer 322 on the receiver item or on already deposited printed material. In general, the diameter of the extrudate 321 downstream of the nozzle 502 is reduced relative to the diameter of the filament 322 upstream of the printer head 501. Hence, the printer nozzle is sometimes (also) indicated as extruder nozzle. Arranging layer 322 by layer 322 and/or layer 322*t* on layer 322, a 3D item 1 may be formed. Reference 575 indicates the filament providing device, which here amongst others include the spool or roller and the driver wheels, indicated with reference 576.

Reference Ax indicates a longitudinal axis (especially of a layer (or filament) or filament axis (in the case of a filament). A length of a layer 322 may be determined along its longitudinal axis Ax.

Reference 300 schematically depicts a control system. The control system may be configured to control the 3D printer 500. The control system 300 may be comprised or functionally coupled to the 3D printer 500. The control system 300 may further comprise or be functionally coupled to a temperature control system configured to control the temperature of the receiver item 550 and/or of the printer head 501. Such temperature control system may include a heater which is able to heat the receiver item 550 to at least a temperature of 50° C., but especially up to a range of about 350° C., such as at least 200° C.

Alternatively or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W.

Note that the 3D printable material is not necessarily provided as filament 320 to the printer head. Further, the filament 320 may also be produced in the 3D printer 500 from pieces of 3D printable material.

Reference D indicates the diameter of the nozzle (through which the 3D printable material 201 is forced).

Figure 1B:
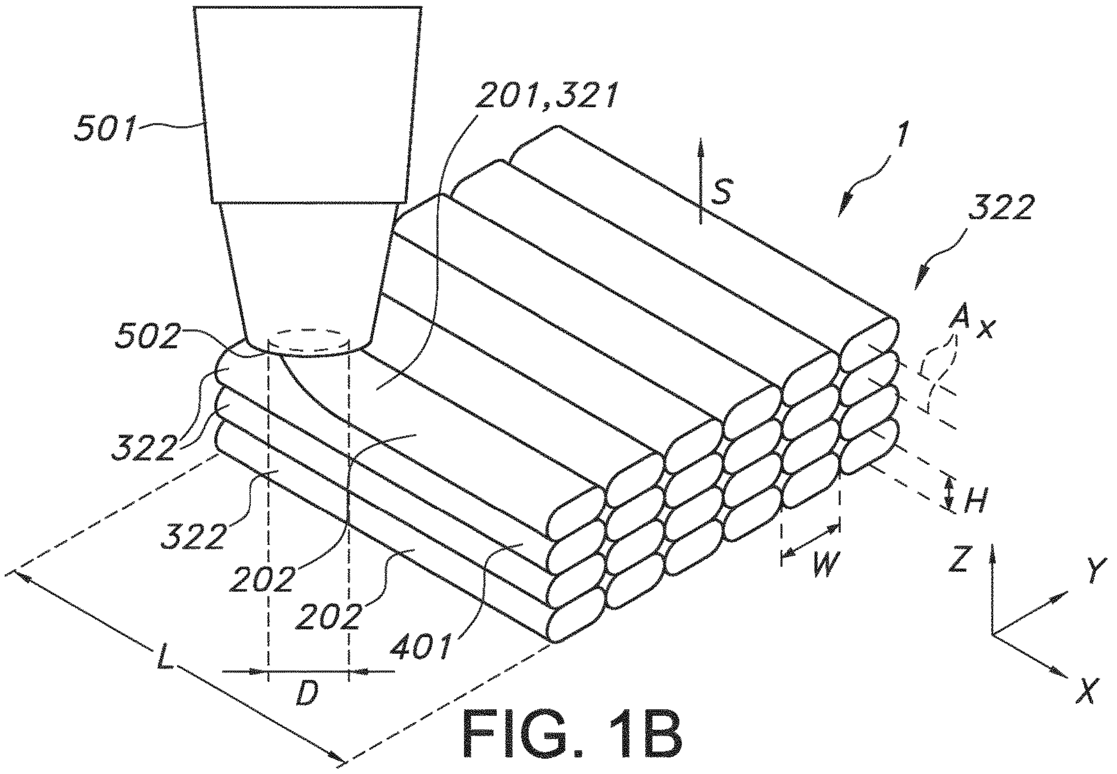

FIG. 1*b* schematically depicts in 3D in more detail the printing of the 3D item 1 under construction. Here, in this schematic drawing the ends of the filaments 321 in a single plane are not interconnected, though in reality this may in embodiments be the case. Reference H indicates the height of a layer. Layers are indicated with reference 203. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

FIG. 1*b* schematically depicts six stacks of each four layers.

Hence, FIGS. 1*a*-1*b* schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1*a*-1*b*, the first or second printable material or the first or second printed material are indicated with the general indications printable material 201 and printed material 202, respectively. Directly downstream of the nozzle 502, the filament 321 with 3D printable material becomes, when deposited, layer 322 with 3D printed material 202.

Figure 1C:
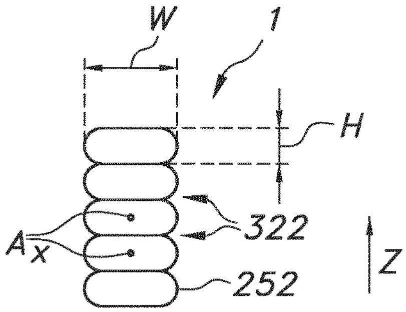

FIG. 1*c* schematically depicts a stack of 3D printed layers 322, each having a layer height H and a layer width W. Note that in embodiments the layer width and/or layer height may differ for two or more layers 322. Reference 252 in FIG. 1*c* indicates the item surface of the 3D item (schematically depicted in FIG. 1*c*).

Referring to FIGS. 1*a*-1*c*, the filament of 3D printable material that is deposited leads to a layer having a height H (and width W). Depositing layer 322 after layer 322, the 3D item 1 is generated. FIG. 1*c* very schematically depicts a single-walled 3D item 1.

Figure 2A:
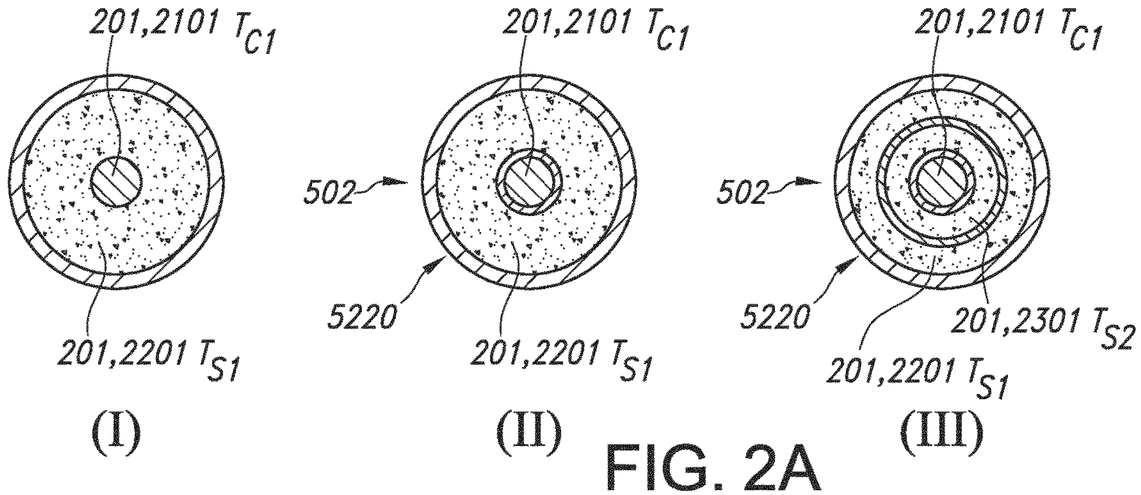
FIGS. 2*a*-2*d* schematically depict some further embodiments.

FIG. 2*a* schematically depicts three nozzle openings in cross-sectional views. Embodiment I is a nozzle opening of a nozzle 520 with a single nozzle opening. For such nozzle 502, a core-shell or core-shell-shell filament may be applied. 3D printable material 201 (in the nozzle opening(s)) is indicated with the respective references. Embodiment II is a nozzle opening of a core-shell nozzle 502. 3D printable material 201 is indicated. Embodiment III is a nozzle opening of a core-shell-shell nozzle 502. 3D printable material 201 is indicated. Also, only for understanding purposes, the associated melting temperatures are indicated.

Figure 2B:
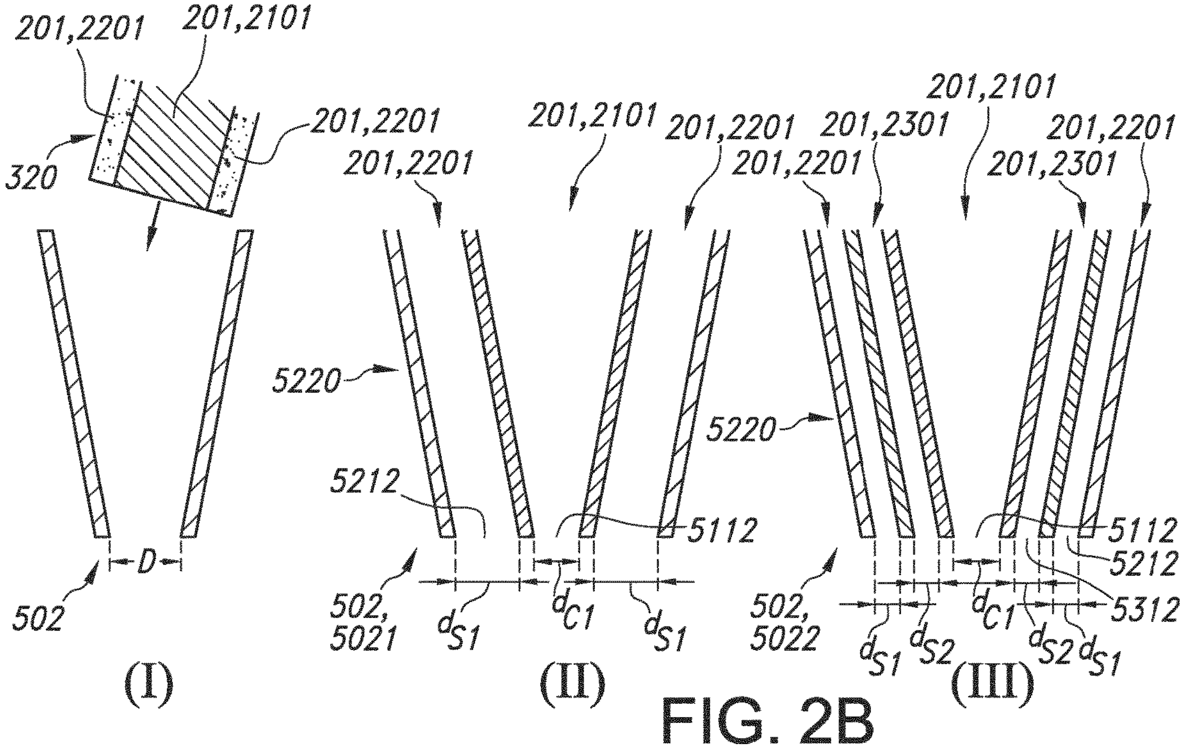

FIG. 2*b* schematically depicts also three nozzle openings, but in cross-sectional views perpendicular to the cross-sectional views of FIG. 2*a*. Note the filament 302 for the nozzle 502 of embodiment I. 3D printable materials are again indicated. Filament 302 is here a core-shell filament.

Figure 2C:
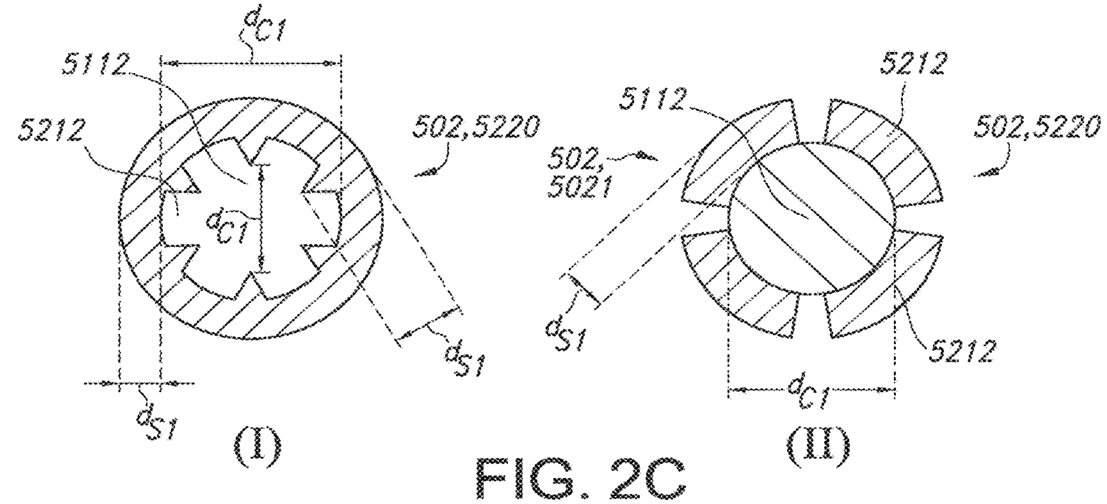

Referring to FIGS. 1*a*-1*c* and to FIGS. 2*a*, the invention provides a method for producing a 3D item 1 by means of fused deposition modelling using a fused deposition modeling 3D printer 500 comprising a printer nozzle 502. The 3D item see also FIG. 2*c* comprises one or more layers 322 of 3D printed material 202. The method may comprise a 3D printing stage comprising providing 3D printable material 201 to the printer nozzle 502. The 3D printable material 201 may comprise 3D printable core material 2101 and 3D printable first shell material 2201. The 3D printable core material 2101 may comprise a core thermoplastic material 2111 having a core thermoplastic material melting temperature $T_{mc1}$. The 3D printable first shell material 2201 may comprise a first shell thermoplastic material 2211 having a first shell thermoplastic material melting temperature $T_{ms1}$. Especially, $T_{mc1}>T_{ms1}$. The 3D printable first shell material

2201 may have a 3D printable first shell material optical property. The 3D printable core material 2101 may have a 3D printable core material optical property different from said 3D printable first shell material optical property. Further, the 3D printing stage may comprise controlling a temperature $T_{dm}$ of the 3D printable material 201 in the printer nozzle 502 according to a scheme wherein during a first time period $t_{p1}$: $T_{mc1}>T_{dm}>T_{ms1}$ may apply and wherein during a second time period $t_{p2}$: $T_{dm}>T_{mc1}$ may apply.

Especially, the 3D printable first shell material optical property and the 3D printable core material optical property may be selected from the group of (a) absorption of light having a first wavelength, (b) diffuse reflection for light having the first wavelength, (c) specular reflection for light having the first wavelength, (d) transmission of light having the first wavelength, and (e) conversion of light having the first wavelength.

In embodiments, the 3D printable material 201 and the 3D printed material 202 comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polyethylene terephthalate (PET), acrylonitrile butadiene styrene (ABS), poly(methyl methacrylate) (PMMA), polystyrene (PS), and styrene acrylic copolymers (SMMA). Especially, the 3D printable core material (2101) and 3D printable first shell material (2201) may be selected from the group of low density polyethylene, high density polyethylene, polypropylene, polyamide, polyoxymethylene, polybutylene terephthalate, and polytethylene terephthalate.

Referring to FIGS. 1*a*-1*c* and 2*a*-2*c*, especially, the printer nozzle 502 may be a core-shell printer nozzle, indicated with references 5021, comprising a nozzle core 5112 and a first nozzle shell 5212, wherein one or more of the following may apply: (a) a first nozzle shell thickness ds1 and a nozzle core diameter dc1 relate according to 3*ds1≤dc1; (b) in cross-sectional view the first nozzle shell thickness d1 varies angularly. In embodiments, one or more of the following may apply: (i) an internal core nozzle surface and/or an external core nozzle surface has in a cross-sectional view structures having a dimension selected from the range of 0.2*ds1−1.5*ds1; and (ii) in cross-sectional view the first nozzle shell 5212 comprises spatially separated sections. In embodiments, the first nozzle shell thickness ds1 may be at maximum 50 μm.

Referring to FIGS. 1*a*-1*c* and 2*a*-2*c*, the invention also provides a method wherein the 3D printing stage comprises: providing 3D printable material 201 to the printer nozzle 502, wherein the 3D printable material 201 may comprise the 3D printable core material 2101, the 3D printable first shell material 2201, and 3D printable second shell material 2301; for providing 3D printed material 202 comprising a core—second shell—first shell structure. The 3D printable second shell material 2301 may comprise a second shell thermoplastic material 2311 having a second shell thermoplastic material melting temperature $T_{ms2}$. Especially, $T_{mc1}>T_{ms2}>T_{ms1}$. Further, optical properties of the 3D printable core material 2101, the 3D printable first shell material 2201, and the second shell material 2301 may differ. The method may further comprise controlling the temperature $T_{dm}$ of the 3D printable material 201 in the printer nozzle 502 according to the scheme wherein during a first time period $t_{p1}$: $T_{ms2}>T_{dm}>T_{ms1}$ applies, wherein during a second time period $t_{p2}$: $T_{mc1}>T_{dm}>T_{ms2}$ applies, and wherein during a third time period $t_{p3}$: $T_{dm}>T_{mc1}$ applies. The 3D printable second shell material optical property is selected from the group of (a) absorption of light having a first wavelength, (b) diffuse reflection for light having the first wavelength, (c) specular reflection for light having the first wavelength, (d) transmission of light having the first wavelength, and (e) conversion of light having the first wavelength.

Hence, referring to FIGS. 1*a*-1*c* and 2*a*-2*c*, providing 3D printable material 201 to the printer nozzle 502 may comprise feeding a core-shell-shell filament to the printer nozzle 502 or providing 3D printable core material 2101, 3D printable first shell material 2201, and 3D printable second shell material 2301 to a core-shell-shell printer nozzle 5022.

As schematically depicted, the printer nozzle 502 is a core-shell-shell printer nozzle, indicated with reference 5022, comprising the nozzle core 5112, the first nozzle shell 5212, and a second nozzle shell 5312 configured between the nozzle core 5112 and the first nozzle shell 5212. One or more of the following may apply: (a) a first nozzle shell thickness ds1 and the nozzle core diameter dc1 relate according to 3*ds1≤dc1; (b) a second nozzle shell thickness ds2 and the nozzle core diameter dc1 relate according to 3*ds2≤dc1; c in cross-sectional view the first nozzle shell thickness d1 varies angularly; and d in cross-sectional view the second nozzle shell thickness d2 varies angularly. Especially, the second nozzle shell thickness ds2 is at maximum 50 μm.

Therefore, referring to FIGS. 1*a*-1*c* and 2*a*-2*c*, the invention also provides a fused deposition modeling 3D printer 500, comprising (a) a printer head 501 comprising a printer nozzle 502, (b) a 3D printable material providing device 575 configured to feed 3D printable material 201 having different optical properties to the printer nozzle 502, and (c) a control system 300; wherein the fused deposition modeling 3D printer 500 is configured to provide said 3D printable material 201 to a receiver item 550, thereby providing a 3D item 1 comprising 3D printed material 202, wherein in an operational mode the fused deposition modeling 3D printer 500 is configured to execute the method as described herein. In embodiments, the printer nozzle 502 may be a core-shell printer nozzle 5021, comprising a nozzle core 5112 and a first nozzle shell 5212, wherein one or more of the following applies: (a) a first nozzle shell thickness ds1 and a nozzle core diameter dc1 relate according to 3*ds1≤dc1; (b) in cross-sectional view the first nozzle shell thickness d1 varies angularly. In specific embodiments, the printer nozzle 502 may be a core-shell-shell printer nozzle 5022, comprising a nozzle core 5112 and a first nozzle shell 5212, and a second nozzle shell 5312 between the former two.

Figure 2D:
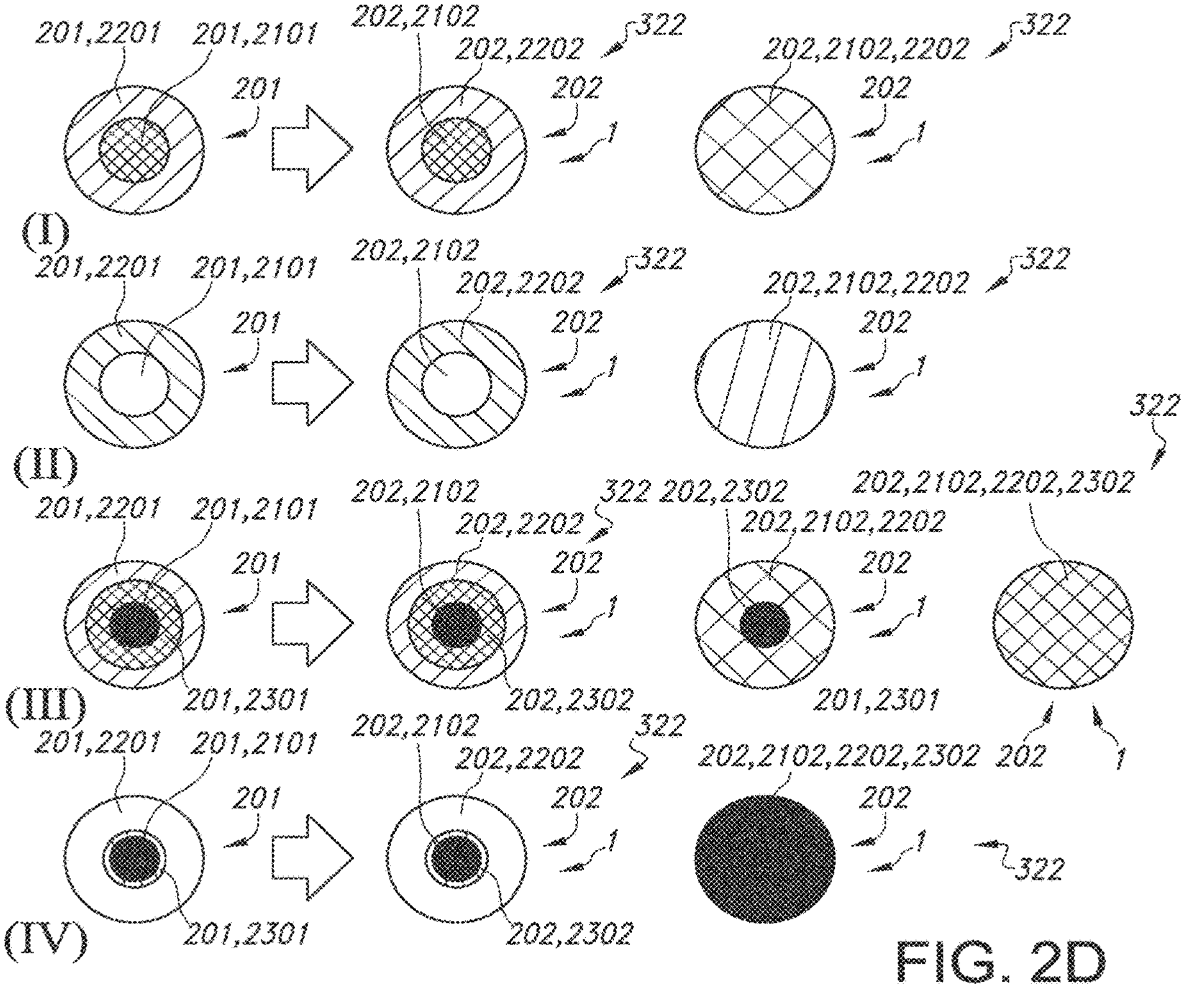

Referring to FIG. 2*d*, the invention also provides a 3D item 1 comprising 3D printed material 202, wherein the 3D item 1 may comprise one or more layers 322 of 3D printed material 202. The 3D printed material 202 may comprise 3D printed core material 2102 and 3D printed first shell material 2202. The 3D printed core material 2102 may comprise a core thermoplastic material 2111 having a core thermoplastic material melting temperature $T_{mc1}$. The 3D printed first shell material 2202 may comprise a first shell thermoplastic material 2211 having a first shell thermoplastic material melting temperature $T_{ms1}$. Especially, wherein $T_{mc1}>T_{ms1}$. The 3D printed first shell material 2202 may have a 3D printed first shell material optical property, the 3D printed core material 2102 may have a 3D printed core material optical property different from said 3D printed first shell material optical property. The 3D item 1 may comprise a primary part of the one or more layers 322 of 3D printed material 202 and a secondary part of the one or more layers 322 of 3D printed material 202, wherein the primary part may have a primary 3D printed material optical property, wherein the secondary part may have a secondary 3D printed material optical property, different from the primary 3D printed material optical property; and wherein one or more layers of the primary part and one or more layers of the secondary part may have different cross-sectional distributions of the 3D printed core material 2102 and the 3D printed first shell material 2202.

FIG. 2*d* schematically depicts two core-shell embodiments, indicated with I and II, and two core-shell-shell embodiments, indicated with III and IV. Left from the arrow, the 3D printable material 201 is depicted, like it may e.g. be in the nozzle or just extruded from the nozzle, or an example of a filament to be fed to a "normal" nozzle. Right from the arrow cross-section of different possible parts of 3D printed layers 322 are schematically depicted, such as especially on the left with relatively lower temperatures and on the right 3D printed at relatively higher temperatures. By way of example, the layers 322 are drawn as circles. In general, however, the cross-section may be flattened, see also FIGS. 1*a*-1*c*.

In embodiments I and II, right from the arrow, the left cross-section of a 3D printed layer may be obtained while printing during a first time period with the condition $T_{mc1}>T_{dm}>T_{ms1}$. In embodiments I and II, right from the arrow, the right cross-section of a 3D printed layer may be obtained while printing during second time period with the condition $T_{dm}>T_{mc1}$. For instance in embodiment I, the 3D printable core material may be yellow and the 3D printable first shell material may be blue. This may be the same for the 3D printed material during the first time period but may lead to a green 3D printed material during the second time period. Or, for instance in embodiment II, the 3D printable core material may be transparent and the 3D printable first shell material may be reflective. This may be the same for the 3D printed material during the first time period but may lead to moderate diffusive 3D printed material during the second time period. In embodiments, the volume of the 3D printable shell material Vs1 may be smaller than the volume of the 3D printable core material Vc1. The relative volumes may be determined on the basis of the cross-sections. In embodiments III and IV, right from the arrow, the left cross-section of a 3D printed layer may be obtained while printing during a first time period with the condition $T_{mc1}>T_{dm}>T_{ms1}$. In embodiment III, right from the arrow, the middle cross-section of a 3D printed layer may be obtained while printing during second time period with the condition. $T_{mc1}>T_{dm}>T_{ms2}$. In embodiment III, right from the arrow, the most right cross-section of a 3D printed layer, and in embodiment IV, right from the arrow, the right cross-section, may be obtained while printing during third time period with the condition $T_{dm}>T_{mc1}$. For instance in embodiment III, the 3D printable core material may be black, the 3D printable first shell material may be blue, and the 3D printable second shell material may be yellow. This may be the same for the 3D printed material during the first time period but may lead to a green 3D printed material during the second time period, and to a dark-green 3D printed material in the third time period. Or, for instance in embodiment IV, the 3D printable core material may be black, the 3D printable first shell material may be transparent, and the 3D printable second shell material may be reflective. This may be the same for the 3D printed material during the first time period but may lead to grey-black 3D printed material during the third time period.

In embodiments, the total volume of the 3D printable shell material Vs1 and of the 3D printable second shell material Vs2 may be smaller than the volume of the 3D printable core material Vc1. The relative volumes may be determined on the basis of the cross-sections.

Figure 3:
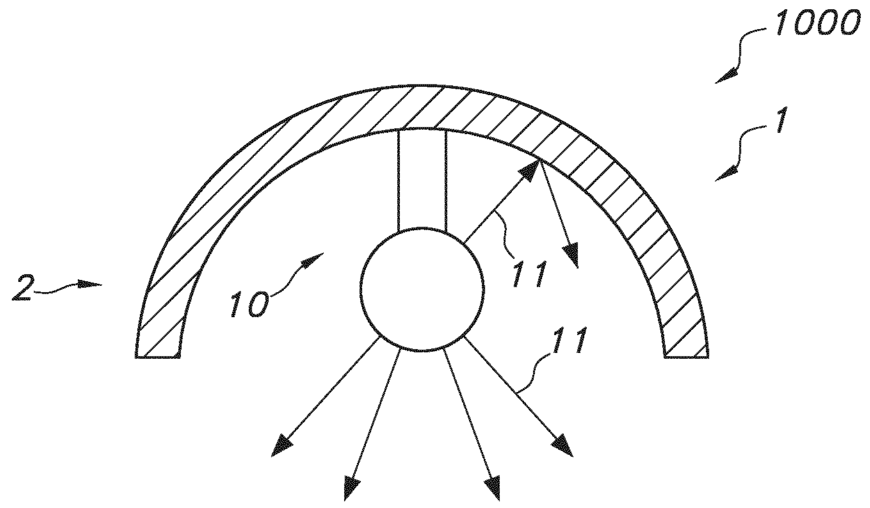
FIGS. 3 and 4 schematically depicts embodiments of applications.
Figure 4:
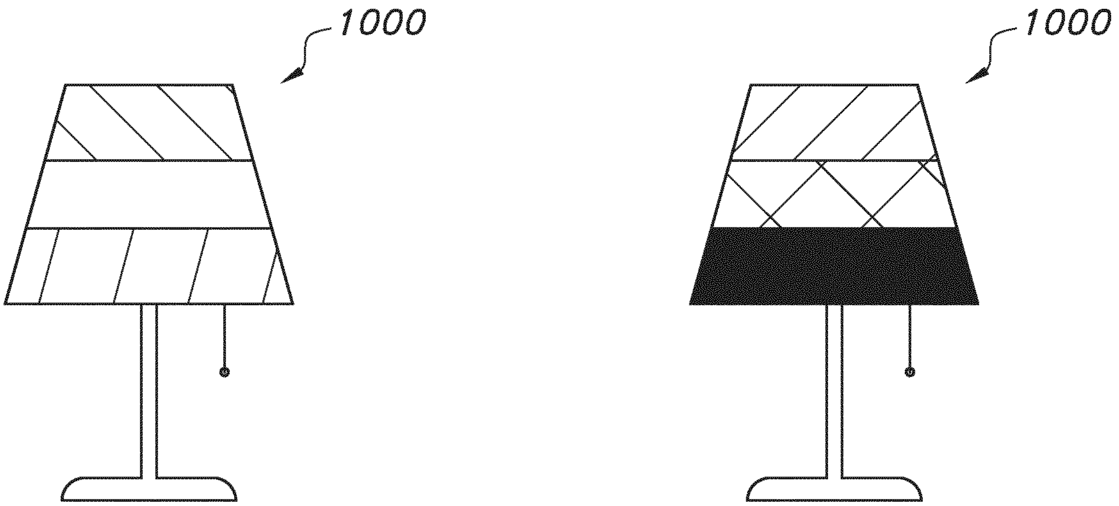

FIG. 3 schematically depicts an embodiment of a lamp or luminaire, indicated with reference 2, which comprises a light source 10 for generating light 11. The lamp may comprise a housing or shade or another element, which may comprise or be the 3D printed item 1. Here, the half sphere (in cross-sectional view) schematically indicates a housing or shade. The lamp or luminaire may be or may comprise a lighting device 1000 (which comprises the light source 10). Hence, in specific embodiments the lighting device 1000 comprises the 3D item 1. The 3D item 1 may be configured as one or more of (i) at least part of a lighting device housing, (ii) at least part of a wall of a lighting chamber, and (iii) an optical element. Hence, the 3D item may in embodiments be reflective for light source light 11 and/or transmissive for light source light 11. Here, the 3D item 1 may e.g. be a housing or shade. The different optical properties may be observed at the internal side of the housing or shade, e.g. to provide optical effects to the light and/or to beam shape the light. For instance, part of the layers may be reflective, and part of the layers may be absorbing and/or light converting. Or for instance part of the layers may be configured with a reflective side to the internal side of the housing or shade (e.g. assuming layers having a transmissive region and a reflective region), and part of the layers may be deposited partly rotated, such that the layers are partly reflective and partly transmissive (assuming layers having a transmissive region and a reflective region). Alternatively or additionally, different optical properties may be observed at the external side of the housing or shade, like layers that are reflective and layers that are light absorbing, or layers that are light transmissive and layers that are light reflective. FIG. 4 schematically depict two shades, which may e.g. be made according to the method as described above, such as e.g. on the basis of embodiment III of FIG. 3*d*.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb “to comprise” and its conjugations does not exclude the presence of elements or steps other than those stated in a claim. Unless the context clearly requires otherwise, throughout the description and the claims, the words “comprise”, “comprising”, and the like are to be construed in an inclusive sense as opposed to an exclusive or exhaustive sense; that is to say, in the sense of “including, but not limited to”.

The article “a” or “an” preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for producing a 3D item by means of fused deposition modeling using a fused deposition modeling 3D printer comprising a printer nozzle, wherein the 3D item comprises one or more layers of 3D printed material, the method comprising a 3D printing stage comprising:

providing 3D printable material to the printer nozzle, wherein:

the 3D printable material comprises 3D printable core material, 3D printable first shell material and 3D printable second shell material;

the 3D printable core material comprises a core thermoplastic material having a core thermoplastic material melting temperature $T_{mc1}$;

the 3D printable first shell material comprises a first shell thermoplastic material having a first shell thermoplastic material melting temperature $T_{ms1}$; wherein $T_{mc1}>T_{ms1}$;

the 3D printable second shell material comprises a second shell thermoplastic material having a second shell thermoplastic material melting temperature $T_{ms2}$; wherein $T_{mc1}>T_{ms2}>T_{ms1}$;

the 3D printable first shell material has a 3D printable first shell material optical property, the 3D printable core material has a 3D printable core material optical property different from said 3D printable first shell material optical property;

controlling a temperature $T_{dm}$ of the 3D printable material in the printer nozzle according to a scheme wherein during a first time period $t_{p1}$: $T_{ms2}>T_{dm}>T_{ms1}$ applies and wherein during a second time period $t_{p2}$: $T_{mc1}>T_{dm}>T_{ms2}$ applies.

2. The method according to claim 1, wherein the 3D printable first shell material optical property and the 3D printable core material optical property are selected from the group of absorption of light having a first wavelength, diffuse reflection for light having the first wavelength, specular reflection for light having the first wavelength, transmission of light having the first wavelength, and conversion of light having the first wavelength.

3. The method according to claim 1, wherein the 3D printable core material and 3D printable first shell material are selected from the group of low density polyethylene, high density polyethylene, polypropylene, polyamide, polyoxymethylene, polybutylene terephthalate, and polyethylene terephthalate or a copolymer of two or more of the aforementioned.

4. The method according to claim 1, wherein during the first time period $t_{p1}$ $T_{mc1}>(T_{dm}+10° C.)>(T_{ms1}+10° C.)$ and wherein during the second time period $t_{p2}$ $T_{dm}>(T_{mc1}+10° C.)$ apply.

5. The method according to claim 1, wherein the 3D printable core material has a first color, wherein the 3D printable first shell material has a second color, different from the first color; and wherein at least part of the 3D printed material has a tertiary color, wherein the tertiary color is a mix color of the first color and the second color.

6. The method according to claim 1, wherein the 3D printing stage comprises:

providing the 3D printable material to the printer nozzle, wherein:

the 3D printable material comprises the 3D printable core material, the 3D printable first shell material, and the 3D printable second shell material; for providing 3D printed material comprising a core—second shell—first shell structure;

optical properties of the 3D printable core material, the 3D printable first shell material, and the 3D printable second shell material differ;

controlling the temperature $T_{dm}$ of the 3D printable material in the printer nozzle according to the scheme wherein during the first time period $t_{p1}$: $T_{ms2}>T_{dm}>T_{ms1}$ applies, wherein during the second time period $t_{p2}$: $T_{mc1}>T_{dm}>T_{ms2}$ applies, and wherein during a third time period $t_{p3}$: $T_{dm}>T_{mc1}$ applies.

7. The method according to claim 1, wherein the method comprises producing a primary part of the one or more layers of 3D printed material during the first time period and producing a secondary part of the one or more layers of 3D printed material during the second time period, wherein the 3D printed material produced during the first time period has a primary 3D printed material optical property, wherein the 3D printed material produced during the second time period has a secondary 3D printed material optical property, different from the primary 3D printed material optical property.

8. The method according to claim 7, wherein the secondary 3D printed material optical property is a combination of the 3D printable first shell material optical property and a 3D printable second shell material optical property; wherein during the first time period $t_{p1}$ $T_{ms2}>(T_{dm}+10°\ C.)>(T_{ms1}+10°\ C.)$, wherein during the second time period $t_{p2}$ $T_{mc1}>(T_{dm}+10°\ C.)>(T_{ms2}+10°\ C.)$, and wherein during a third time period $t_{p3}$ $T_{dm}>(T_{mc1}+10°\ C.)$ apply.

* * * * *